United States Patent [19]
Gauthier et al.

[11] Patent Number: 4,690,840
[45] Date of Patent: Sep. 1, 1987

[54] PROCESS FOR PREPARING ALLOYED NEGATIVE ELECTRODES

[75] Inventors: Michel Gauthier; Denis Fauteux, both of Quebec, Canada

[73] Assignees: Hydro-Quebec, Quebec, Canada; Societe Nationale Elf Aquitaine, Paris, France

[21] Appl. No.: 719,978

[22] Filed: Apr. 4, 1985

[30] Foreign Application Priority Data

Apr. 11, 1984 [CA] Canada .................................... 451782

[51] Int. Cl.⁴ ...................... H01M 4/12; H01M 4/40; B05D 1/18
[52] U.S. Cl. ...................................... 427/436; 429/218
[58] Field of Search ............... 420/218, 194; 29/623.1; 429/590, 520, 528; 427/436

[56] References Cited

U.S. PATENT DOCUMENTS 4,002,492  1/1977  Rao .................................... 429/194
4,056,885  11/1977  Rao .................................... 429/218

OTHER PUBLICATIONS

J. P. Gabano, "Lithium Batteries", Acad. Press, N.Y., 1983.

Primary Examiner—Donald L. Walton
Attorney, Agent, or Firm—Oblon, Fisher, Spivak, McClelland & Maier

[57] ABSTRACT

The disclosure describes a method for the preparation of metallic alloys containing an alkali or alkali-earth metal, such as lithium, and a host metal, such as aluminum. Initially, an active organic solution of the alkali or the alkali-earth metal is prepared, and a source of the alkali or alkali-earth metal which are both brought together with one another. On the other hand, a metallic structure containing the host metal is prepared, the metallic structure is brought together with the organic solution which is kept in touch with the source of metal until there is formed an alloy of the host metal and of the alkali or alkali-earth metal with the metallic structure, and the alloy possesses an activity which is determined by that of the organic solution. The organic solution then acts as transfer agent of the alkali or alkali-earth metal towards the host metallic structure. To prepare a negative electrode, the alloy is brought together with an electrolyte, such as a thin polymeric film. The disclosure also describes the electrodes as well as the electrochemical generators produced by using these electrodes. Considerably improved properties of cycling are obtained.

73 Claims, 12 Drawing Figures

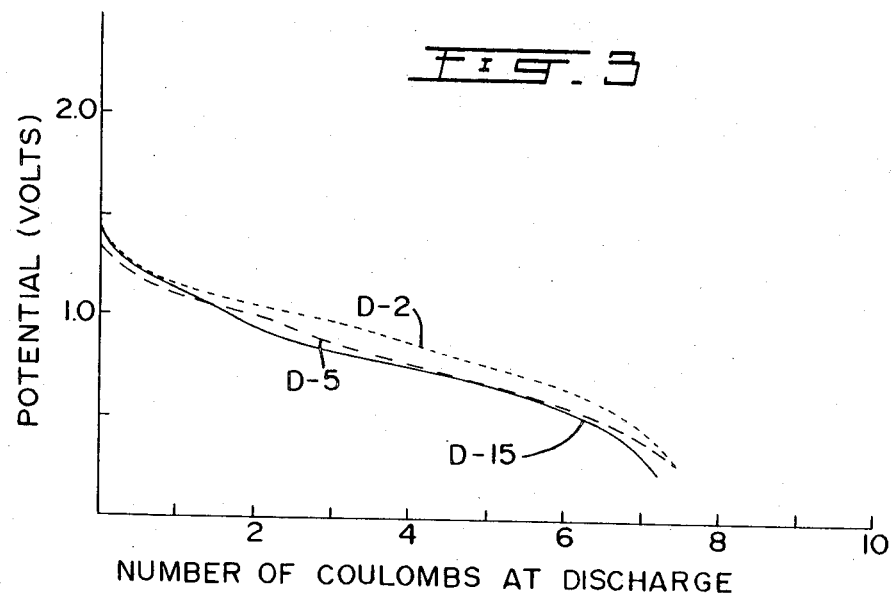
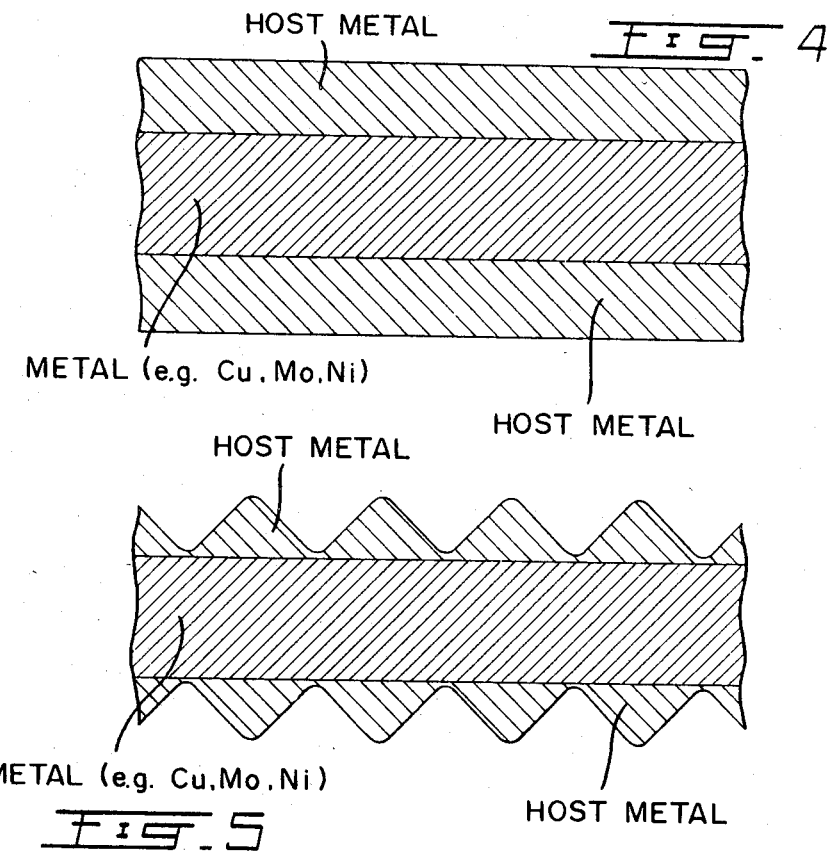

FIG. 6
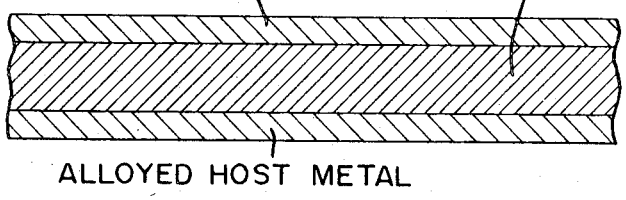
FIG. 7
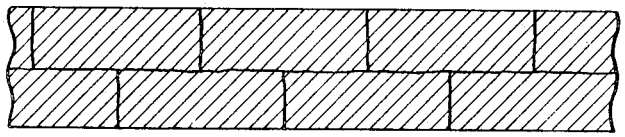
FIG. 8
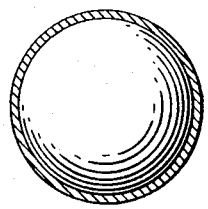
FIG. 9
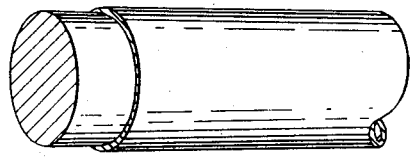
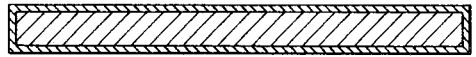

PROCESS FOR PREPARING ALLOYED NEGATIVE ELECTRODES

BACKGROUND OF INVENTION (a) Field of the Invention

The present invention relates to a process or a method for preparing alloys and eventually alloyed negative electrodes. The invention also relates to new industrial products, the alloys and alloyed negative electrodes thereby obtained as well as a device making use of such negative electrodes. More specifically, the present invention is directed to electrochemical generators having high densities of energy, which generally include lithium, and is more particularly directed to alloyed negative electrodes, i.e. where lithium is present in a host structure, which is generally metallic, whose activity is lower than that of metallic lithium.

(b) Description of Prior Art

In most of the generators, utilizing alkali metals with organic, liquid or polymeric electrolytes, it has been observed that lithium has a tendency to form passivating films. The formation of such films, which is discussed in detail in J. P. Gabano, "Lithium Batteries", Acad. Press, N.Y. 1983, does not generally prevent the necessary ionic exchanges needed for the discharge of the lithium electrode because these films are generally thin and ionic conductors. This is particularly the case of non-rechargeable batteries. However, it has been realized that such films can electronically insulate an important fraction of the lithium when the latter is present in particulate form or has been electrochemically redeposited. One then observes an important decrease of the utilization of the negative electrode, which decrease must then be compensated by an excess capacity of the negative electrode. This problem is substantially reduced in the case of rechargeable systems by using lithium alloys having a high rate of diffusion of lithium and which are not thermodynamically favorable to the electrochemical depositing of pure metallic lithium during recharge. This will result in preventing the formation of dendrites of lithium and the electrical insulation of freshly deposited lithium.

However, these alloys are generally hard and brittle intermetallic compounds which are generally prepared by pyrometallurgy and are consequently hard to convert into thin shapes such as by lamination. They are therefore used more often in particulate forms, pressed with a binder, as fritted substances or they can be prepared by electrochemical means, such as in the form of accumulators mounted in discharged state. These various processes designed for liquid electrolytes are not well adapted to polymeric electrolytes which make use of large surfaces and thicknesses of the order of some tens of microns.

A partial solution to these problems has been proposed in the case of polymeric electrolytes formed of complex made of polyethers combined with an alkali salt, by utilizing composite electrodes where the alloy is dispersed in particulate form in a polymeric electrolyte which also acts as a binder between the particles, and in the presence of a carbon additive which has been added to improve the electronic and ionic exchanges at the interfaces. References will particularly be made to U.S. application Ser. No. 430,696 now U.S. Pat. No. 4,517,265 in the name of Hydro-Quebec, filed Sept. 30, 1982. This solution enables to prepare thin electrodes with large surfaces which are particularly well adapted to thin film generators operating with polymeric electrolytes. However, it has been observed that such electrodes can present in certain cases, particularly at operating temperatures higher than 80° C., a progressive decrease of utilization of the alloys during successive cycles. Moreover, such electrodes remain costly to prepare in view of the high cost of the starting alloys generally prepared by pyrometallurgy, for examples about $500/lb for LiAl. It should also be remembered that these alloys should then be crushed, screened and mounted in the form of electrodes under strictly inert atmosphere.

SUMMARY OF INVENTION

It is an object of the present invention to provide a process for the preparation of alloys in which one of the components is an alkali or alkali-earth metal.

Another object of the present invention consists in providing a process which is economical, easy to operate for preparing alloyed electrodes with high surfaces and particularly well adapted with respect to electrochemical properties, such as cycling, to be associated with electrochemical generators with thin films, such as those utilizing polymeric electrolytes.

Another object of the present invention consists in providing a process of preparing alloys of a host metal with an alkali or alkali-earth metal, alloyed negative electrodes prepared from these alloys and electrolytes which are preferably solid and based on polymers, and devices using the electrodes so produced in electrochemical generators which generally but not necessarily are based on lithium.

Another object of the present invention concerns the preparation of alloys of a host metal, for example selected among aluminum, magnesium, silicon, zinc, boron, mercury, silver, alloys and mixtures thereof with an alkali or alkali-earth metal such as lithium, intended to give thin electrodes with high surface area.

Another object of the invention relates to the preparation of thin negative electrodes having large surface area, which are particularly well adapted to thin film polymeric electrolytes.

Another object of the present invention relates to the preparation, preferably near ambient temperature, of special compounds of alkali or alkali-earth metals with metals which can react to form intermetallic compounds, alloys or solid solutions.

Another object of the present invention relates to the control of the composition of alloys prepared according to the present invention as well as their final shape.

Another object of the present invention resides in the carrying out of treatments, which are more or less superficial, after the shaping of a host structure, such as for example, the formation of solid solutions of lithium in aluminum $Li_\epsilon Al$ where $\epsilon$ represents a few percentage of Li with respect to Al.

According to the present invention, these alloys are obtained by reacting a host element of the final alloy having the intended shape and structure, with an organic solution of an alkali or alkali-earth metal, preferably metallic lithium, generally in free radical form, also in contact with a source of said metal, such as lithium, so as to form alloys whose shape is determined by the starting host element. The activity of the alkali or alkali-earth metal, such as lithium can be controlled by the choice of the host metal and by the chemical composition of the solution, for example one whose free radical activity is generally lower than +600 mVvsLi° in the case of the preparation of negative electrodes.

In other words, in its broad aspect, the invention relates to a method for the preparation preferably at room temperature, of metallic alloys containing an alkali or alkali-earth metal as well as a host metal, which comprises preparing an active organic solution of said alkali or alkali-earth metal as well as a source of said alkali or alkali-earth metal, and bringing said solution and said source of metal together, separately preparing a metallic structure containing said host metal, bringing the metallic structure together with the organic solution which is kept in contact with the source of metal, until there is formation of an alloy of the host metal and of the alkali or alkali-earth metal with the metallic structure, and the alloy has an activity which is determined by that of the organic solution, said organic solution then act as a transfer agent of the alkali or alkali-earth metal towards the metallic host structure.

The invention also concerns a method of preparing alloyed metallic electrodes, which comprises contacting the alloys whose preparation has been described above with an electrolyte, such as a polymeric electrolyte for example those described in the French Patent Applications of Michel Armand and Michel Duclot, Nos. 78.32976, 78.32977 and 78.32978, now published under Nos. 2442512, 2442514 and 2442513.

The organic solution of alkali or alkali-earth metal comprises for example a mixture of liquids including at least a polar aprotic solvent which is compatible with the alkali or alkali-earth metal and which is also capable of solvating ions of this metal. Examples of such solvents include ether type solvents, such as THF, dioxolan, glymes, crown ethers as well as substituted amine base solvents, for example N,N,N',N'-tetramethyl 1,2-ethane diamine (TMED), N,N,N',N'-tetramethyl 1,3 propane diamine (TMPD) and N,N',N'',N''-pentamethyl diethylene triamine (PMDET). The organic solution also generally includes a compound having conjugated double bonds usually aromatic, such as naphthalene, biphenyl, anthracene and benzophenone which can delocalize the electrons of the metal and an organic liquid diluting agent, for example benzene, toluene, alkanes or mixtures thereof. The organic solution should be capable of controlling the activity of the alkali or alkali-earth metal preferably at values lower than +600 mVvsLi°.

To do this, the molar ratios of the components of the organic solution which include the polar solvent, the compound having a conjugated double bonds and the liquid organic diluting agent, are preferably the following:

polar solvent: from $10^{-5}$ to $<1$
compound having conjugated double bonds: $<$ from $10^{-5}$ to 0.2
organic diluent: $<1$.

More particularly, these ratios can be the following:
polar solvent: $10^{-3}$ to 0.2
compound having conjugated double bonds: $10^{-4}$ to 0.1
organic diluent: $<1$.

For example, in the case where the organic solution is made of THF, naphthalene and benzene, the molar ratios could be the following:

TMED or THF: about $9\times10^{-2}$
biphenyl or naphthalene: about $7\times10^{-2}$
benzene: about 0.84.

With respect to the source of alkali or alkali-earth metal, it is generally made of the pure metal which is intended to be alloyed with the host metal. Of course any source of lithium whose activity in lithim is superior to the activity of the solution at equilibrium may also be used.

According to a preferred embodiment of the invention, the metallic alloy or electrode obtained has a predetermined shape, and to obtain this, the originating structure is constituted so as to be a precursor of the final shape of the metallic alloy or electrode.

According to another preferred embodiment of the invention, the organic solution has a high benzene content which contains little addition of aromatic compounds and polar solvents capable of solvating lithium ions and compatible with the lithium, which enables to obtain electrodes which are not or slightly chemically passivated.

The host metal normally but not necessarily comprises aluminum. For example, other host metals could be used which could form alloys or intermetallic compounds with said alkali or alkali-earth metals, such as magnesium, silicon, zinc, boron, mercury, silver, alloys or the like.

The host structure can obviously vary to a large extent, but it is understood that its configuration and its constitution, therefor its specific shape, should be adapted to the alloy and eventually to the negative electrode which is intended to be obtained. Many possibilities could be considered of which some examples will be discussed below.

There is a case where the host structure is made of a metallic sheet for example of copper, molybdenum or nickel, which comprises a plain layer of host metal, such as aluminum, on at least one and preferably on the two faces of the metallic sheet. The thickness of the metallic sheet can preferably vary between $1\mu$ and $20\mu$, while the thickness of the layer of host metal can vary between $5\mu$ and $50\mu$, preferably about $25\mu$. In this case, the formation of the alloy will be carried out by transfer of the alkali or alkali-earth metal, preferably of lithium towards the host metal, thereby obtaining a more or less extended penetration of the layer of host metal, depending on the conditions of operation.

According to another possibility, similar to the preceeding one, the layer(s) of host metal have a dendritic aspect. In this case, the entire thickness of the host metal on the metallic sheet varies between 5 and $50\mu$, and is preferably about $25\mu$.

Another possibility resides in the fact that the host structure is essentially made of a sheet of the host metal. In this case, there could be formation of a layer of alloy on one or two faces of the metallic sheet. In certain conditions, where the transfer of the alkali or alkali-earth metal is carried out to a limited extent, the so-called penetration of the alloy on the metallic sheet stops at a certain level, leaving the host metal intact.

The host structure can be made of a metallic sheet, such as aluminum whose thickness normally varies between $1\mu$ and $200\mu$ in one case and between $5\mu$ and $500\mu$, preferably between $50\mu$ and $300\mu$ in the other case. This choice of thickness enables to obtain, after formation of the alloy, in the first case, alloyed electrodes which are entirely converted throughout, or if need be, in the second case, having two alloyed faces with a zone of non reacted aluminum at the center. This last case has the advantage of improving the mechanical properties of the alloy in addition to ensure the control of the activity of lithium in the alloy (about +380 mVvsLi°) in view of the coexistence of non reacting aluminum and the alloy.

If, on the other hand, as stated above, the alloy is allowed to be formed in depth, the metallic sheet becomes completely alloyed. This integral formation of alloy can go to the extent of modifying the voluminal and mechanical properties of the resulting product so that the sheet is desintegrated into particles of alloy which can be used to prepare alloys or electrodes. For example, these particles could be used to prepare flexible anodes such as described in U.S. application Ser. No. 430,696, filed Sept. 30, 1982.

Finally, if one wishes to eventually obtain spheres, fibers or flakes of the alloy, it is merely sufficient to use spheres, fibers or flakes of the host metal which is brought together with the organic solution, the latter being kept in contact with a source of alkali or alkali-earth metal. These particles of alloy should not generally exceed 50$\mu$ on at least one their dimensions so as to enable the preparation of the electrodes in the form of thin films starting from these particles. For example, the host structure can be made of particles of Al, Mg, Si, Zn, in the form of spheres, flakes or fibers of preselected granulometry so as to form alloys of lithium whose stoechiometries approximate LiAl, Li$_{0.9}$Mg, Li$_{3.5}$Si, LiZn from a solution containing this metal in free radical form.

According to another preferred embodiment of the invention, the organic solution is based on benzene and contains naphthalene or biphenyl and N,N,N'-N'-tetramethyl 1,2-ethane diamine or THF saturated with lithium in free radical form and contains an excess of metallic lithium.

According to another preferred embodiment of the invention, the organic solution is based on benzene and contains a limited quantity of metallic lithium so as to control the activity and the proportion of alloy formed.

According to another preferred embodiment of the invention, the host structure is a sheet made of an aluminum matrix containing fibers or flakes of Al$_3$Ni or Al$_2$Cu.

When the organic solution contains lithium, the latter is obviously in contact with a source of lithium. The solution can be based on naphthalene and N,N,N',N'-tetramethyl 1,2-ethane diamine and the activity of the metallic lithium is then between +200 and +400 mVvsLi°. When the solution is based on biphenyl and THF the activity of the metallic lithium is stable and is about 380 mVvsLi°. If the organic solution of lithium is based on biphenyl and N,N,N',N'-tetramethyl 1,2-ethane diamine, the activity of lithium is between < +50 and +200 mVvsLi°.

The method according to the invention is interesting in that it enables a continuous process where the organic solution possesses controlled activity in lithium. Moreover, since the organic solution acts as a transfer agent of the lithium (reversible reaction) there can be an excellent homogeneity of the composition of the final alloy. Moreover, since there is no consumption of the organic solution and because the active components of this solution can be diluted in benzene, for example, the process is economical and mainly dependent on the cost of lithium and of the other components of the alloy. This process moreover removes the usual steps of thermic synthesis, crushing, screening and definite shaping of the alloyed electrodes presently used as described, for example, in U.S. application Ser. No. 430,696, filed Sept. 30, 1982.

The invention also concerns a metallic electrode consisting of a structure of the host metal, preferably aluminum, magnesium, zinc, silicon, boron, mercury, and alloys thereof, which have been alloyed with an alkali or alkali-earth metal. The fact that the structure of the alloy prepared by the process according to the invention is continuous, contrary to the composite electrodes, ensures the electronic conduction which is necessary for electrochemical reactions and prevents an extended penetration of the alloy by the electrolyte when the alloy and the electrolyte are contacted together. Formation of films which are electronically non conductive at the interface between the alloy and the polymer electrolyte, inside the alloy, is also prevented because there is no in depth penetration of the electrolyte in the continuous alloy.

According to a preferred embodiment of the invention, the host metal structure of the electrode is made of a metallic sheet which is a good electronic conductor, such as Cu, Ni, Al, Zn, Mo, etc., on which there appears a dendritic or planar deposit of a host metal such as Al, Zn, etc. The thickness of the alloyed metal on the metallic sheet is about 5$\mu$ to 50$\mu$. The use of dendritic deposit for the host metal after formation of the alloy enables to obtain electrodes with large exchange surfaces with the electrolyte. therefor sustaining high current densities.

According to another preferred embodiment of the invention, the structure of the host metal of the electrode is made of a sheet of the host metal alloyed with lithium and whose thickness is between about 5 $\mu$ and 500 $\mu$, preferably between about 20 $\mu$ and 300 $\mu$.

According to another preferred embodiment of the invention, the structure of the host metal of the electrode comprises an aluminum matrix which contains fibers such as intermetallic compounds Al$_3$Ni or Al$_2$Cu. This host structure is alloyed with lithium and in view of the presence of the intermetallic compounds, it preserves its mechanical properties, even when the activity of lithium in the organic solution is lower than +200 mVvsLi° and the $\beta$ enriched phase of the lithium-aluminum alloy is formed.

According to another preferred embodiment of the invention, the structure of the host metal of the electrode comprises particles of Al, Mg, Si, Zn, B, Ag, alloyed with lithium under stoechiometric values close to LiAl, Li$_{0.9}$Mg, Li$_{3.5}$Si, LiZn.

According to another preferred embodiment of the invention, the host structure corresponds to particles of Al, Mg, Zn, Si, previously classified according to size or shape (spheres, flakes, fibers) for example at 20±5$\mu$, so as to permit the preparation of composite electrodes after reaction with lithium, according to U.S. Pat. Ser. No. 430,696 of Hydro-Quebec filed on Sept. 30, 1982. The cost of production of said electrodes is then substantially reduced and the performance is improved by means of the precise control of the size and shape of the particles of alloy prepared according to the present invention. For example, the stoechiometries obtained can be in the vicinity of Li$_{0.9}$Mg, Li$_{3.5}$Si, LiZn, LiAl starting from a biphenyl solution of excess lithium, and N,N,N',N'-tetramethyl 1,2-ethane diamine; or still Li$_{1-\epsilon}$Al+Al starting from a naphthalene solution, an excess of lithium and THF. In the latter case, the reason for allowing a small amount the host metal of the alloy to coexist with the alloy is to promote a thermodynamic control of the activity of lithium during successive recharge cycles.

Another important advantage of the present invention concerns the remarkable electrochemical properties observed with the electrodes and the devices produced with polymeric electrolytes according to the present invention. Indeed, it has been realized that the claimed process enables the preparation of alloys of generally continuous structure whose mechanical properties are sufficient after lithium has been introduced therein so that once in the presence of the polymeric electrolyte, all the parts of the alloy remain in electronic contact. The net effect is to dispense with the need of electronic conduction additives in the electrode, such as carbon, and to improve the densities of voluminal and mass energy. On the other hand, the control of the morphology of the alloy before introducing lithium enables to localize in the electrode zones of alloy with varying densities and to specifically determine the surfaces of ionic exchange between the zones of alloy and the polymeric electrolyte. For example, the choice at the start of dendritic structures (Al, Zn or the like) or thin sheets (Al, Mg or the like) will enable to obtain in the first case electrodes which can sustain high current densities and in the second case, thin electrodes with large surfaces and high densities of voluminal and mass energy. It is believed that the remarkable electrochemical properties of cycling of the electrodes obtained by coupling alloys according to the invention with a polymeric electrolyte, which will be described in the examples which follow are due on the one hand to the high viscosities of the polymeric electrolytes which tend to reduce or eliminate the penetration of the electrolyte between the more or less broken up grains of the alloy zones, then prevent the formation of electronically insulating films and consequently the loss of utilization of the electrode during cycling; moreover, since the polymeric electrolyte acts as a binder about the zones of agglomerated alloy there is no desintegration of the alloy during cycling. Another factor which is very important in so far as the cycling properties of the negative electrodes according to the present invention is that the alloys produced can contain, if needed, zones of unreacted host metal, for example aluminum or α-aluminum in the presence of the electrochemically active alloy β-LiAl. This helps to control of the activity of the alloy close to $+380$ mVvsLi° and as illustrated in the examples which follow, has a favorable effect on the preservation of the structure of the electrode and on the maintenance of the cycling properties.

An inherent advantage of the process according to the present invention is to permit that the important voluminal variations which take place in the host structure during the formation of the alloy do indeed take place before the alloy is contacted with the electrolyte and is mounted in a complete generator. This advantage becomes obvious if, by way of example, one prepares a large surface generator starting from a sheet of aluminum and a positive electrode prepared in discharged state. It is then observed that during the first charge, such a device is rapidly short-circuited following important dimensional variations which are higher than 30% of the sheet when the lithium is introduced. These variations of the dimensions of the sheet frequently produce short-circuits in the electrolyte, mainly when the latter is constituted of a thin film of polymer (100–10μ).

The existence of solutions of alkali metal, generally in free radical form, which closely resemble those utilized in the present invention, has been known for many years. For example, reference may be made to "Electrons in Fluids" (The Nature of Metal-Amonia Solution), J. Jortner & N. R. Kestner, Springer - Verlag, 1973. According to the present invention, it has been however noted that for certain compositions, such solutions can be obtained with lithium whose activities are controlled and are closed to metallic lithium, for example $+200$ to $+400$ mVvsLi° for solutions comprising naphthalene and N,N,N',N'-tetramethyl 1,2-ethane diamine; for solutions comprising biphenyl and THF, the activity is relatively stable at $+380$ mVvsLi°, finally, for solutions comprising biphenyl and N,N,N',N'-tetramethyl 1,2 ethane diamine the activity of lithium is between the $+200$ and less than $+50$ mVvsLi°. Moreover, it has been established that such solutions can be used as transfer agents for lithium in the preparation of charged negative electrodes having high activities of lithium $< +400$ mVvsLi° and controlled shapes, from an initial structure. Moreover, the preferred but non limiting choice of solutions having a high content of benzene and a low content of aromatic compounds and polar solvents capable of solvating lithium ions, and compatible with lithium, corresponds to a process of manufacture which is not very costly and leads to alloys which are not chemically passivated.

The invention is not limited to metals mentioned, to the aromatic compounds and polar solvents mentioned, which may in certain cases combine the functions of solvating Li°, delocalizing electrons of the metal or of diluent, as long as the organic solution of lithium acts as carrier of Li°, that it is reversible so as to enable the homogenization of the alloy and permits the control of the activity of dissolved lithium, preferably at values of $+600$ mVvsLi°.

BRIEF DESCRIPTION OF DRAWINGS

The invention is illustrated without being limited by the annexed drawings in which:

FIG. 3 represents a serie of curves illustrating the trend of discharge plateaus obtained at 27° C. and 60 μA;

FIG. 4 is a schematic representation of a host structure made of a metallic sheet comprising a plane layer of host metal on the two faces;

FIG. 5 is a schematic representation of a host structure made of a metallic sheet comprising two layers of host metal having a dendritic appearance;

FIG. 6 is a schematic representation of a host structure essentially constituted of the host metal of which the two surfaces have zones of alloyed host metal;

FIG. 7 is a schematic representation of a host structure essentially constituted of the host metal alloy alloyed in depth to preserve the structure of the sheet;

FIG. 8 is a schematic representation of particles of alloyed host metal resulting from the desintegration of a sheet as illustrated in FIG. 7;

FIG. 9 is a schematic representation of a mixture of spheres, fibers and flakes of host metal alloyed according to the present invention at their surface as in the case of FIG. 6;

DESCRIPTION OF PREFERRED EMBODIMENT

The examples mentioned below and illustrated on the figures illustrate how the process according to the invention is particularly well adapted to the production of thin electrodes intended for generators with large surfaces, generally operating with polymer electrolytes and optimized in order to obtain high densities of current and multiple cycles of discharge charge and high density of mass and voluminal energy.

EXAMPLE 1

This example illustrates the dependency of the lithium activity from solutions containing free radicals with respect to the nature and the concentration of its constitutive elements.

(a) Given a free radical solution in final state, containing 0.1M naphthalene, 0.06M tetramethyl ethane diamine and benzene, in the presence of a source of metallic lithium in excess.

The activity of lithium of the free radical solution is measured precisely according to the following electrochemical chain:

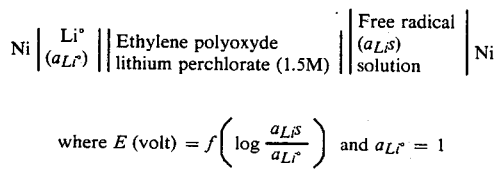

where $E \text{ (volt)} = f\left(\log \frac{a_{Li}s}{a_{Li^\circ}}\right)$ and $a_{Li^\circ} = 1$ for the free radical solution described the potential observed, after stirring and stabilization ($\simeq 1$ hr.) is: $E = +0.40$ V vs Li°.

(b) The free radical solution comprises 0.03M naphthalene, 0.06M tetramethyl ethane diamine and benzene in the presence of a source of metallic lithium in excess. The potential observed, after stirring and stabilization is $E = +0.31$ V vs Li°.

(c) The free radical solution comprises 0.005M biphenyl, 0.01M tetramethyl ethane diamine and benzene in the presence of a source of metallic lithium in excess. The potential observed after stirring and stabilization is: $E = +0.10$ V vs Li°.

(d) The free radical solution comprises 0.007M benzophenone, 1.0M tetrahydrofuran and benzene in the presence of a source of metallic lithium in excess. The potential observed after stirring and stabilization is: $E = +1.40$ V vs Li°.

Therefor, it appears possible to control the activity of lithium from the nature, relative ratios and concentrations of the constitutive elements of the free radical solutions. A wide domaine of activity of lithium is accessible ($0 < a_{Li}s < +1.5$ V vs Li°). The control of the activity of lithium at voltages $\leq 600$ mV vs Li° is particularly interesting for the synthesis of alloys with elevated activities of lithium which, when used in electrochemical generators will produce high battery voltages and high energy densities.

EXAMPLE 2

Figure 1:
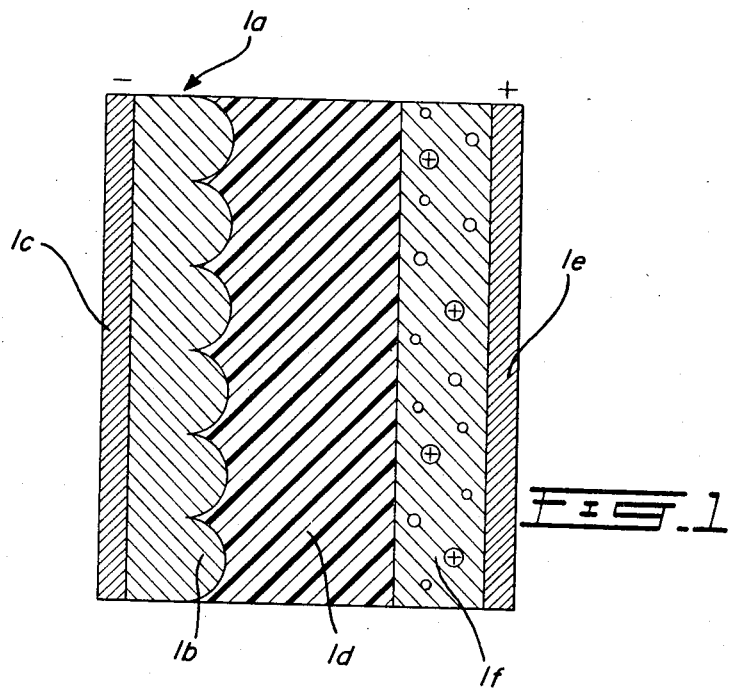
FIG. 1 is a schematic representation of an electrochemical generator utilizing a negative electrode according to the present invention.
Figure 2:
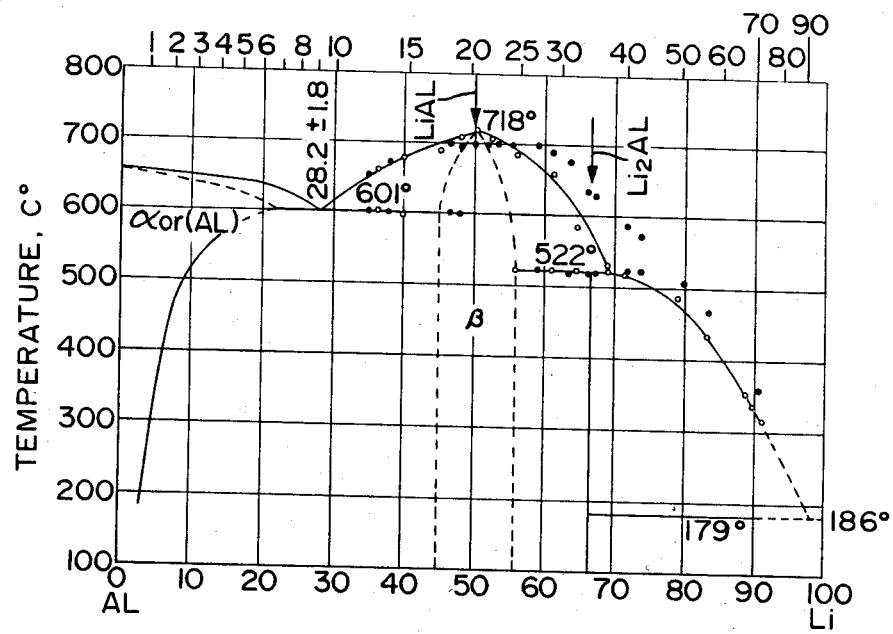
FIG. 2 represents a phase diagram of the system Li-Al.

A first example of negative electrode and generator prepared according to the invention is illustrated in FIG. 1 and is obtained in the following manner:

A host structure of aluminum 1a is prepared by electrochemically depositing in the form of dendrites of nodular shapes aluminum 1b on a sheet of copper 1c to give a total thickness of aluminum of about 25μ. This structure is then immersed in an organic solution of benzene whose composition is $5 \times 10^{-3}$ molar naphthalene, $1.5 \times 10^{-2}$ molar tetramethyl ethane diamine, which is saturated with lithium in free radical form and in the presence of an excess of metallic lithium so as to give a lithium activity of the order of +400 mVvsLi°. After about 8 hours, the reaction of formation of the alloy is completed and the alloy has an activity corresponding to that of the free radical solution. The control of the activity of the free radical solution enables in this case to prevent a desintegration of the aluminum alloy which would take place if the high content phase of the phase diagram of the system Al-Li would be formed (see FIG. 2). This alloy which has preserved the shape of the initial aluminum and whose lithium composition is about 10 C/cm² is thereafter contacted by transfer at 80° C. with a film of polymeric electrolyte 1d which comprises a copolymer of ethylene oxide and propylene oxide whose composition is according to the ratio EO/PO=95/5 and having a molecular weight of about 500,000. Such copolymers of ethylene oxide and their method of preparation and of use in electrochemical generators are described in U.S. application Ser. No. 500,193, U.S. Pat. No. 4,505,997, and Ser. No. 500,194, U.S. Pat. No. 4,556,616, filed June 1, 1983.

The positive electrode is made of particles of MoO₂ of about 15μ and of acetylene black bonded by the polymer of the electrolyte in the volume ratios of (0.30–0.10–0.60) and has a capacity of about 3.5 C/cm². The ratio 0/Li between the oxygen of the monomer metal of the polymer and the lithium salt LiClO₄ is about 12/1 for the entire generator and the total surface of the generator is about 3.9 cm². FIG. 3 illustrates the trend of the discharge plateaus obtained at 27° C. and at 60 μA and the maintenance of the capacity observed in coulombs at discharged cycles identified D2, D5 and D15.

It is observed that the dendritic form of the negative electrode enables to obtain relatively high currents at 27° C. as a result of the important exchange surface between the alloy and the polymeric electrolyte while the good behavior during cycling confirms the good maintenance of the electronic contact between the various parts of the alloy and the absence of the phenomenon of electrical insulation of the alloy as a result of the formation of passivating films.

EXAMPLE 3

Figure 10:
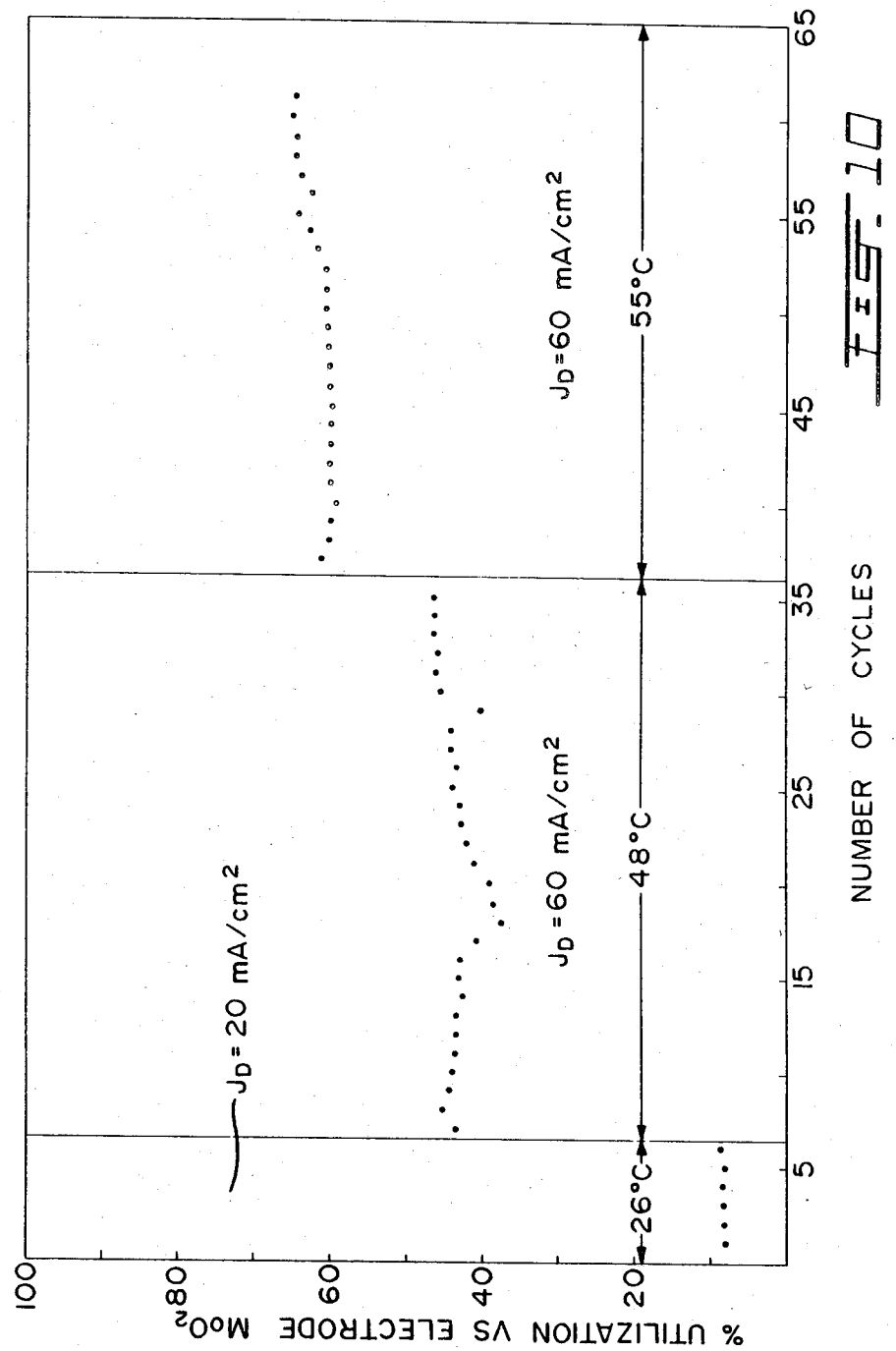
FIG. 10 is a curve illustrating the cycling properties of a generator according to the present invention at 26°, 48° and 55° C.

In this example, the negative electrode is obtained from a sheet of aluminum whose thickness is about 300μ which is immersed during about 6 hours in a benzene solution containing $1.4 \times 10^{-1}$ molar tetramethyl ethane diamine and $6 \times 10^{-2}$ molar naphthalene. In this case, the control of the activity of lithium in the solution and of the time of reaction enable to preserve the initial shape of the sheet since the activity of the solution does not permit the formation of the high content β-rich phase and because unreacted pure or α-aluminum remain present in the center of the structure (FIG. 6). The capacity of the alloy formed superficially under these conditions is about 7 C/cm$^2$. The electrode is completed by applying on the alloy some polymeric electrolyte dissolved in a solvent such as benzene and allowing the latter to evaporate. The battery is completed by means of an electrolyte comprising a copolymer of ethylene oxide and methyl glycidyl ethers EO/MGE=95/5 of molecular weight of about 500,000 and having a ratio O/Li:≃16/1, the salt of lithium being LiClO$_4$. The battery also comprises a positive electrode and its stainless steel collector including MoO$_2$, acetylene black, a polymeric electrolyte in a volume ratio (0.40-0.10-0.50) whose capacity is about 5 C/cm$^2$. The thickness of the electrolyte is ≃110$\mu$ and the surface is 5.6 cm$^2$. The cycling properties at 26°, 45° and 55° C. of the generator are indicated in FIG. 10 and appear excellent on more than 60 consecutive cycles at rates varying from C/70 to ≃C/20.

Even though in this example the alloy formed is electrochemically utilized only on one of its faces, the man of the art will understand that this technology is easily accessible to fabrication of two face electrodes and enabling to optimize the densities of energy of generators. On the other hand, unreacted aluminum, or aluminum present at the center of the structure can facilitate the collection of current in the assembly of such electrodes. Moreover, this example shows how the electrode prepared so as to permit the coexistence of the alloy formed with a second phase, in the present case unreacted aluminum, promotes the cycling properties by thermodynamically promoting the control of the activity of the lithium of the electrode close to +300 mVvsLi° which prevents the formation of the high content $\beta$-rich phase during the recharge and ensures the physical integrity of the electrode.

EXAMPLE 4

In this example the initial structure is a thin sheet of aluminum 25$\mu$ and the organic solution is based on benzene and contains 9.0×10$^{-2}$ molar biphenyl and about 1 molar THF. The reaction is continued during about 100 hours and it is noted that the initial sheet is transformed into an alloy whose final thickness is about 40$\mu$ after complete conversion. The lithium activity of the alloy measured according to example 1 is about 380 mVvsLi° which is substantially the same value as one observed for the solution. This example therefor shows how the control of the activity of the organic solution enables to preserve the original shape of the sheet as long as the activity does not permit the formation of $\mu$-rich aluminum. A generator prepared from this alloy in the same manner as example 2 leads substantially to the same performances as those of FIG. 3.

EXAMPLE 5

Figure 11:
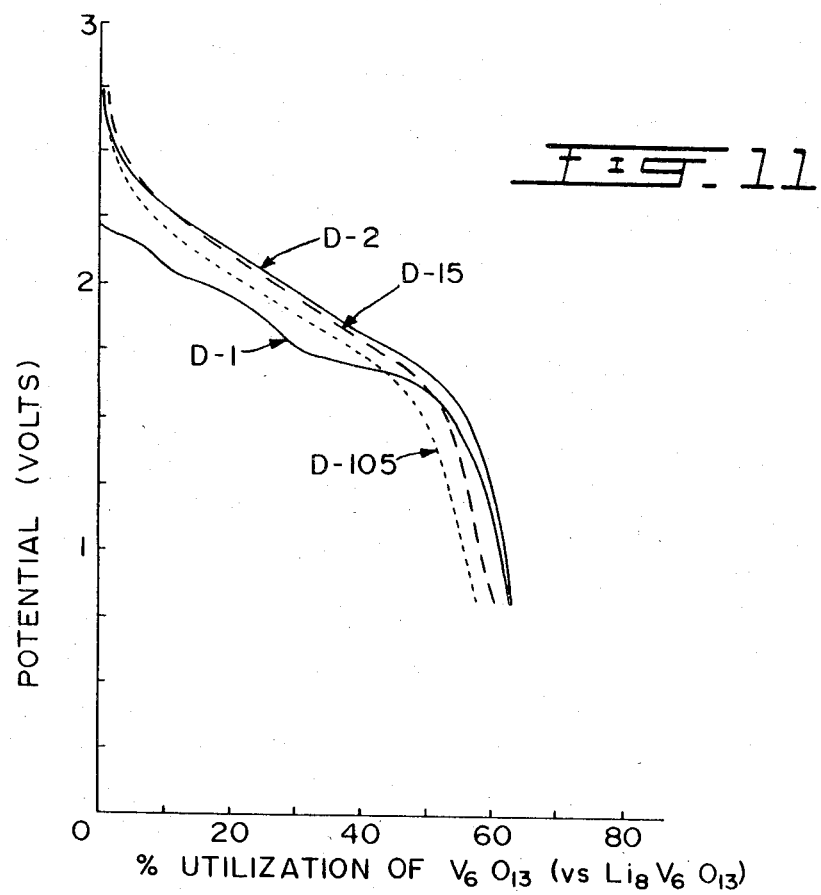
FIG. 11 is another curve illustrating the cycling plates of a generator according to the invention obtained at 100° C.

In this example, the initial structure is a sheet of aluminum about 300$\mu$ which is contacted with a solution 1.5×10$^2$ molar of tetramethyl ethane diamine and 6.5×10$^{-3}$ molar naphthalene during 12 hours after which lithium is removed, then one hour later, the alloy is also removed and washed. This treatment permits to control the quantity of alloy formed (≃20 C/cm$^2$) superficially and its homogeneity. The generator is thereafter mounted by utilizing an electrolyte based on polyethylene of molecular weight 5M which is first fused on the alloy at about 90° C. then contacted on the other face with a positive composite electrode formed of V$_6$O$_{13}$ (<38$\mu$≃2 C/cm$^2$), acetylene black and a polymeric electrolyte under volume ratios of (0.40-0.15-0.45) and its stainless steel collector. The surface of the generator is about 3.9 cm$^2$, the ratio O/Li is −9/1 for LiClO$_4$ and the discharged and charged currents are about 100 $\mu$A/cm$^2$. The discharge plates of this generator obtained at 100° C. are illustrated in FIG. 11 for tests D1, D2, D15, D105. Except for the first discharge whose shape is typical of the behaviors of V$_6$O$_{13}$ and whose capacity is lower than planned, following a partial discharged when assembling the parts, the following plates are remarkably stable on more than 100 cycles of deep discharge (≧60%) and appear controlled by the positive electrode. This example is a good illustration of the advantages of the electrodes prepared according to the invention under relatively high conditions of temperature.

EXAMPLE 6

Given a free radical solution comprising an excess of metallic lithium, an excess of benzene and limited quantities of biphenyl and tetramethyl ethylene diamine. The last two components are present in molar ratios of 3.5 and at concentrations such that the lithium activity of the solution is comprised between +100 and +200 mVvsLi°.

A known weight of aluminum, in the form of a sheet 25$\mu$ thick by ≃1 cm$^2$ of surface is immersed in the solution.

The reaction takes place at room temperature and lasts about 20 hours. The product obtained, when the reaction is completed, is a powder of an alloy of lithium and aluminum consisting or granular particles of cubic shape whose average dimensions are approximately 20$\mu$×10$\mu$×10$\mu$. This powder is filtrated from the solution dried then weighted. The weight gain resulting from the formation of the alloy with respect to the initial weight of aluminum enables to evaluate the stoechimetry of the alloy at about Li$_{0.5}$Al$_{0.5}$.

The chemical activity of lithium in the alloy, measured according to the method described in example 1 is: 188 mVvsLi°, which corresponds to the activity of lithium in the $\beta$-rich phase (FIG. 2) at a stoechiometry of Li$_{0.56}$Al$_{0.44}$ according to the diagram activity/composition published by T. R. Jow and C. C. Liang (Journal of the Electrochemical Society 129, 7, (1982) 1429-1434). The production of an alloy having high lithium activities, a high content of $\beta$-rich phase, is accompanied by an increase of volume which results for the case described here in a desintegration of the initial sheet.

The determination of the stoechiometry of the alloy by measuring the chemical activity of lithium is an agreement with gravimetric determination of the stoechiometry of the same synthetic alloy.

Powders of predetermined granulometries obtained by screening, in which the diameters of the particles are <38$\mu$, containing Zn, Si and Ag are consecutively immersed in the free radical solution. After about 24 hours of reaction time, the powders produced are filtrated from the solution, dried and weighted. The stoechiometries of the synthetized alloys are determined and the results are as follows: Li$_{0.55}$Ag$_{0.45}$, Li$_{0.51}$Zn$_{0.49}$ and Li$_{0.76}$Si$_{0.24}$. By the same technical method as previously, the chemical activity of these alloys is measured and the following results are obtained: +114 mV, 180 mV and +144 mV respectively.

EXAMPLE 7

The alloy powders $Li_{0.56}Al_{0.44}$, $Li_{0.55}Ag_{0.45}$ and $Li_{0.51}Zn_{0.49}$ described in example 6 are used to prepare composite negative electrodes according to the procedure described in U.S. Ser. No. 430,696.

After having prepared these electrodes, they are mounted with a polymeric electrolyte and a positive electrode so as to give complete electrochemical generators. In the present case, the polymeric electrolyte comprises an elastomeric membrane whose thickness varies between $75\mu$ and $150\mu$ and which is formed of a polyether and lithium perchlorate ($POE-LiClO_4$) complex in a ratio $O/Li=8$. The positive electrode is made of a sheet of about 25 $\mu$m thick, of metallic aluminum supporting a composite material based on $MoO_2(\simeq 40\% V)$, Shawinigan black ($\simeq 10\% V$) and complex: polyether-$LiClO_4$ having a ratio O/Li of 8.

(a) 3 g of the alloy powder $Li_{0.51}Al_{0.49}$ described in example 6, that is 67% by by weight, and 1.5 g of Shawinigan black, that is 33% by weight have been intimately mixed. From this mixture, 1.46 g has been sampled and the latter was added to 0.6 g of ethylene polyoxide in solution in an organic organic solvent, then the suspension was homogenized before being spread in thin film on a stainless steel support. From this anode, there is taken a sample of 4 $cm^2$;

(b) the operation as in (a) is repeated with commercial pyrometallurgical $Li_{0.5}Al_{0.5}$ (KBI).

Figure 12:
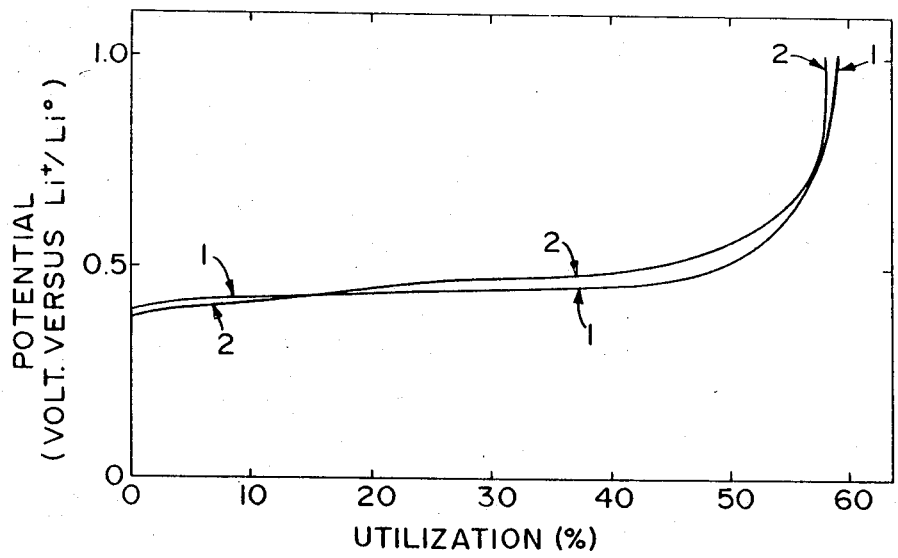
FIG. 12 is a curve illustrating the behavior of anodes according to the invention.

Two generators have been mounted according to the procedure described, and the anodes were discharged at 100° C. and 125 $\mu A$ $cm^{-2}$. In both cases, the initial use of the lithium of the alloys is close to 58% to 60% of theoretical capacities. The behavior of these two anodes is illustrated and compared in FIG. 12, where curve 1 is obtained for the lithium aluminum allow described in example 6 and curve 2 is obtained for a commercial lithium aluminum alloy. The voltages of the anodes are measured with respect to a lithium electrode of reference.

(c) A composite anode containing the following components has been prepared in the following proportions: 64% by weight of $Li_{0.51}Zn_{0.45}$, 9% by weight of Shawinigan black and 27% by weight of polyethylene oxide in the form of a benzene solution containing 6% of material. After homogenization, there is obtained a suspension which is spread on a thin sheet of stainless steel and which after evaporation of benzene leaves a film of about 25 $\mu$m.

A sample of 4 $cm^2$ is taken. An electrochemical generator is mounted, wherein the positive electrode is based on $MoO_2$, as previously described.

The anode is discharged at 50° C. and at 60 $\mu A$. Under these conditions, 35% of the lithium present in the alloy is used to give a battery voltage close to $+1.3$ to $+1.4$ volt.

(d) A composite anode containing 74% by weight of $Li_{0.55}Ag_{0.45}$ and 26% by weight of polyethylene oxide has been prepared in the manner described in (c). An electrochemical generator is mounted wherein the positive electrode is also based on $MoO_2$.

The anode is discharged at 50° C. and at 60 $\mu A$. Under these conditions, 42% of the lithium present in the alloy is used to give a battery voltage of close to 1.5 volt.

EXAMPLE 8

The organic solution of example 6 having an activity lower than $+200$ mV is used in the presence of a structure of aluminum containing a small amount of intermetallic compounds of $Al_3Ni$ in the form of fibers present in the aluminum. In this case, in spite of a high activity of lithium, the formation of LiAl having a high content of $\beta$-rich phase does not result in the desintegration of the structure in view of the presence of the fibers. A test made with a generator similar to the one of example 2 leads to equivalent performances except for the voltage of the first discharge which is higher by about $+175$ mV.

It is understood that these examples are intended to illustrate the advantages of the present invention but are not limiting in so far as the choice of the initial structures, the composition of the organic solution, of the elements forming the alloy and of the electrolytes used which may, by way of examples, under certain conditions, be organic, liquid or molten salts operating at low temperatures.

We claim:

1. Method for the preparation of metallic alloys containing an alkali or alkali-earth metal as well as a host metal, which comprises preparing an active organic solution of said alkali or alkali-earth metal in metallic form, as well as a source of said alkali or alkali-earth metal which are brought together, separately preparing a metallic structure containing said host metal and keeping said metallic structure separate from said source of alkali or alkali-earth metal, contacting together the metallic structure with the organic solution the latter being kept in contact with the source of metal until formation of a superficial alloy of said host metal and of the alkali or the alkali earth metal with the metallic structure, and the alloy has an activity which is determined by that of the organic solution, said organic solution then serving as transfer agent of the alkali or alkali-earth metal towards the host metallic structure.

2. Method according to claim 1, wherein the preparation is carried out at room temperature.

3. Method according to claim 1, wherein the alkali or alkali-earth metal comprises lithium Li°.

4. Method according to claim 1, wherein the organic solution contains metallic lithium, and is in free radical form as a result of containing said metallic lithium.

5. Method according to claim 1, wherein the host metal is capable of forming alloys, intermetallic compounds, or solid solutions with alkali or alkali-earth metal.

6. Method according to claim 1, wherein the organic solution comprises a mixture of liquids including at least one polar aprotic solvent which is compatible with the alkali or alkali metal and is capable of solvating ions of said alkali or alkali-earth metal, and conjugated double bond compound which can delocalize the electrons of said alkali or alkali metal and an organic diluent liquid which is compatible with the alkali or alkali-earth metal, said organic solution being capable of controlling the activity of said alkali or alkali-earth metal.

7. Method according to claim 6, wherein the organic solution is capable of controlling the activity of said alkali or alkali-earth metal at values lower than 600 mVvsLi°.

8. Method according to claim 6, wherein the polar aprotic solvent is selected from the group consisting of ether based solvents and substituted amino base solvents.

9. Method according to claim 8, wherein the polar aprotic solvent is selected from the group of THF, dioxolan, glymes and crown ethers.

10. Method according to claim 8, wherein the polar aprotic solvent is selected from the group consisting of N,N,N',N'-tetramethyl 1,2-ethane diamine, N,N,N',N'-tetramethyl 1,3-propane diamine and N,N,N'',N''-pentamethyl diethylene triamine.

11. Method according to claim 6, wherein the conjugated double bond compound is selected from the group consisting of naphthalene, biphenyl, anthracene and benzophenone.

12. Method according to claim 6, wherein the organic diluent is selected from the group consisting of benzene, toluene, alkane and mixtures thereof.

13. Method according to claim 6, wherein the molar ratios of the components of the organic solution are the following:
polar aprotic solvent: $10^{-5}$ to $<1$
conjugated double bond compounds: $<10^{-5}$ to 0.2
organic diluent: $<1$.

14. Method according to claim 13, wherein the molar ratios are the following:
polar aprotic solvent: $10^{-3}$ to 0.2
aromatic compounds: $10^{-4}$ to 0.1
organic diluent: $<1$.

15. Method according to claim 13, wherein when the organic solution comprises THF or N,N,N',N'-tetramethyl 1,2-ethane diamine, naphthalene or biphenyl and benzene, the molar ratio is the following:
THF or N,N,N',N'-tetramethyl 1,2-ethane diamine: about $9 \times 10^{-2}$
biphenyl or naphthalene: about $7 \times 10^{-2}$
benzene: about 0.84.

16. Method according to claim 6, wherein the organic solution has a high content of inert diluent but contains little aromatic compounds and polar aportic solvents capable of solvating lithium ions and compatible with lithium.

17. Method according to claim 16, wherein the inert diluent comprises benzene.

18. Method according to claim 1, wherein the organic solution contains naphthalene or biphenyl.

19. Method according to claim 1, wherein the organic solution contains THF and N,N,N',N'-tetramethyl 1,2-ethane diamine.

20. Method according to claim 1, wherein the host metal is selected from the group consisting of aluminum, magnesium, silicon, zinc, boron, mercury, silver and alloys thereof.

21. Method according to claim 20, wherein the host metal comprises aluminum.

22. Method according to claim 1, wherein the organic solution comprises benzene and contains naphthalene or biphenyl, N,N,N',N'-tetramethyl-1,2 ethane diamine or THF, and is saturated with lithium, said solution being in free radical form as a result of containing metallic lithium, said solution containing an excess of said metallic lithium.

23. Method according to claim 1, wherein the organic solution comprises benzene, and contains naphthalene or biphenyl, N,N,N',N'-tetramethyl-1,2 ethane diamine or THF, and is saturated with lithium, said solution being in free radical form as a result of containing metallic lithium, said solution containing a limited quantity of metallic lithium so as to control the proportion of alloy formed.

24. Method for the preparation of alloyed metallic electrodes containing an alkali or alkali-earth metal as well as a host metal the whole being in contact with an electrolyte, which comprises preparing an active organic solution of said alkali or alkali-earth metal in metallic form, as well as a source of said alkali or alkali-earth metal which are brought together, separately preparing a metallic structure containing said host metal and keeping said metallic structure separate from said source of alkali or alkali-earth metal, contacting together the metallic structure with the organic solution, the latter being kept in contact with the source of metal until formation of a superficial alloy of said host metal and of the alkali or the alkali-earth metal with the metallic structure, and the alloy has an activity which is determined by that of the organic solution, said organic solution then acts as transfer agent of the alkali or alkali-earth metal towards the host metallic structure, the resulting alloy being contacted with an electrolyte.

25. Method according to claim 24, wherein the alloy is contacted with a polymeric electrolyte.

26. Method according to claim 25, wherein the polymeric electrolyte comprises polyethers.

27. Method according to claim 25, wherein the contact of the alloy and of the polymeric electrolyte is carried out so as to define in said electrode zones where the alloy is not penetrated by the polymer.

28. Method according to claims 24, 25 or 26, wherein the electrolyte is contacted with the alloy, in molten form.

29. Method according to claims 25 or 26, wherein the electrolyte is contacted with the alloy in a solution, said solution being compatible with said alloy.

30. Method according to claim 24, wherein the metallic electrode obtained has a predetermined shape, and that for this purpose, the initial metallic structure is prepared so as to be a precursor of the final shape of said electrode, said shape being adaptable to produce electrodes as thin film.

31. Method according to claim 24, wherein the alkali or alkali-earth metal comprises lithium Li°.

32. Method according to claim 31, wherein the organic solution is based on naphthalene in which the activity of the metallic lithium is between about $+200$ and about $+400$ mVsLi°.

33. Method according to claim 31, wherein the organic solution is based on biphenyl in which the activity of the metallic lithium is between about $+200$ and about $+80$ mVvsLi°.

34. Method according to claim 24, wherein the organic solution contains metallic lithium, and is in free radical form as a result of containing said metallic lithium.

35. Method according to claim 34, wherein the organic solution containing metallic lithium is in contact with the source of lithium.

36. Method according to claim 24, wherein the host metal is capable of forming alloys, intermetallic compounds or solid solutions with alkali or alkali-earth metals.

37. Method according to claim 24, wherein the organic solution comprises a mixture of liquids including at least one polar aprotic solvent which is compatible with the alkali or alkali-earth metal and has a solvating effect on the ions of said alkali or alkali-earth metal, and conjugated double bond compound which can delocalize the electrons of said alkali or alkali-earth metal and a compatible liquid organic diluent, said organic solution being capable of controlling the activity of said alkali or alkali-earth metal.

38. Method according to claim 37, wherein the organic solution is capable of controlling the activity of said alkali or alkali-earth metal to values lower than 600 mVvsLi°.

39. Method according to claim 37, wherein the polar aprotic solvent is selected in the group consisting of ether base solvents and substituted amine base solvents.

40. Method according to claim 39, wherein the polar aprotic solvent is selected from the group consisting of THF, dioxolan, glymes and crown ethers.

41. Method according to claim 39, wherein the polar aprotic solvent is selected from the group consisting of N,N,N',N'-tetramethyl 1,2-ethane diamine, N,N,N',N'-tetramethyl 1,3-propane diamine, and N,N,N'',N''-pentamethyl diethylene triamine.

42. Method according to claim 37, wherein the conjugated double bond compound is selected from the group consisting of naphthalene and biphenyl.

43. Method according to claim 37, wherein the compatible organic diluent is selected from the group consisting of benzene, toluene, alkane and mixtures thereof.

44. Method according to claim 37, wherein the molar ratios of the components of the organic solution are the following:
polar aprotic solvent: $10^{-5}$ to $<1$
conjugated double bond compounds: $<10^{-5}$ to $0.2$
organic diluent: $<1$.

45. Method according to claim 44, wherein the molar ratios are the following:
polar aprotic solvent: $10^{-3}$ to $0.2$
aromatic compounds: $10^{-4}$ to $0.1$
organic diluent: $<1$.

46. Method according to claim 44, wherein when the organic solution comprises THF or N,N,N',N'-tetramethyl 1,2-ethane diamine, naphthalene or biphenyl and benzene, the molar ratio is the following:
THF or N,N,N',N'-tetramethyl 1,2-ethane diamine: about $9 \times 10^{-2}$
biphenyl or naphthalene: about $7 \times 10^{-2}$
benzene: about 0.84.

47. Method according to claim 24, wherein the organic solution contains napththalene or biphenyl.

48. Method according to claim 24, wherein the organic solution contains THF and N,N,N',N'-tetramethyl 1,2-1,2-ethane diamine.

49. Method according to claim 24, wherein the organic solution has a high content of inert diluent and contains little aromatic compounds and polar aprotic solvents which have a solvating effect on the lithium ion and are compatible with lithium, thereby enabling to obtain electrodes which are not very electrochemically passivated.

50. Method according to claim 49, wherein the inert diluent comprises benzene.

51. Method according to claim 24, wherein the host metal is selected from the group consisting of aluminum, magnesium, silicon, zinc, boron, mercury, silver and alloys thereof.

52. Method according to claim 51, wherein the host metal comprises aluminum.

53. Method according to claim 52, wherein the organic solution comprises lithium and is in contact with a a source of lithium.

54. Method according to claim 53, wherein after shaping the host structure, the latter undergoes superficial treatment.

55. Method according to claim 54, wherein the superficial treatments are carried out by forming solid solutions of lithium in aluminum $Li_\epsilon Al$ where $\epsilon$ corresponds to a few percentages of Li with respect to aluminum.

56. Method according to claim 24, wherein the metallic structure containing said host metal comprises a metallic sheet having a plane layer of host metal.

57. Method according to claim 56, wherein the metallic sheet is selected from the group consisting of copper, molybdenum and nickel.

58. Method according to claim 57, wherein the plane layer of host metal comprises aluminum.

59. Method according to claims 56, 57 or 58, wherein the thickness of the metallic sheet varies between about $1\mu$ and $25\mu$, while the thickness of the layer of host metal varies between $5\mu$ and $50\mu$.

60. Method according to claims 56, 57 or 58, wherein the thickness of the metallic sheet varies between about $1\mu$ and $25\mu$, while the thickness of the layer of host metal is about $25\mu$.

61. Method according to claim 24, wherein the metallic structure containing said host metal comprises a metallic sheet having a layer of host metal which presents a dendritic surface.

62. Method according to claim 61, wherein the metallic sheet is selected from the group consisting of copper, molybdenum and nickel.

63. Method according to claim 62, wherein the dendritic surface of the host metal comprises aluminum.

64. Method according to claims 61, 62 or 63, wherein the total thickness of the dendritic layer of host metal varies between about $5\mu$ and $50\mu$.

65. Method according to claim 24, wherein the metallic structure containing said host metal is essentially made of a sheet of said host metal.

66. Method according to claim 65, wherein the metallic structure comprises a sheet of aluminum.

67. Method according to claim 66, wherein the sheet of aluminum has a thickness which varies between about $5\mu$ and $500\mu$, and the reaction is allowed to proceed until the sheet has one or two alloyed faces and non-reacted zone, and maintaining coexistence between the alloy formed and the non-reacted host structure.

68. Method according to claim 67, wherein the aluminum sheet has a thickness which varies between about $50\mu$ and $300\mu$.

69. Method according to claim 24, wherein the host structure comprises a mixture of spheres, fibers or flakes of said host metal which are contacted with the organic solution to give spheres, fibers or flakes of alloys which are treated with the electrolyte.

70. Method according to claim 69, wherein the spheres, fibers or flakes of host metal are not larger than $50\mu$ along of one of their dimensions and films of alloy are formed on these particles.

71. Method according to claim 69, wherein the host structure comprises particles of Al, Mg, Si, Zn in the form of spheres, flakes or fibers of predetermined granulometry selected so as to form alloys of lithium responding to stoichiometries in the vicinity of $LiAl$, $Li_{0.9}Mg$, $Li_{3.5}Si$, $LiZn$ from a free radical solution of this metal.

72. Method according to claim 24, wherein the organic solution is based on benzene and contains naphthalene or biphenyl, and N,N,N',N'-tetramethyl 1,2- ethane diamine or THF, and is saturated with lithium said solution being in free radical form as a result of containing metallic lithium, said solution containing an excess of metallic lithium.

73. Method according to claim 72, wherein the organic solution is based on benzene and contains naphthalene or biphenyl, and N,N,N′,N′-tetramethyl 1,2-ethane diamine or THF, and is saturated with lithium, said solution being in free radical form as a result of containing metallic lithium, said solution containing a limited quantity of said lithium.

* * * * *